F. J. TILLMAN.
CALCULATING MACHINE.
APPLICATION FILED MAY 15, 1916.
1,394,800.
Patented Oct. 25, 1921.
7 SHEETS—SHEET 3.
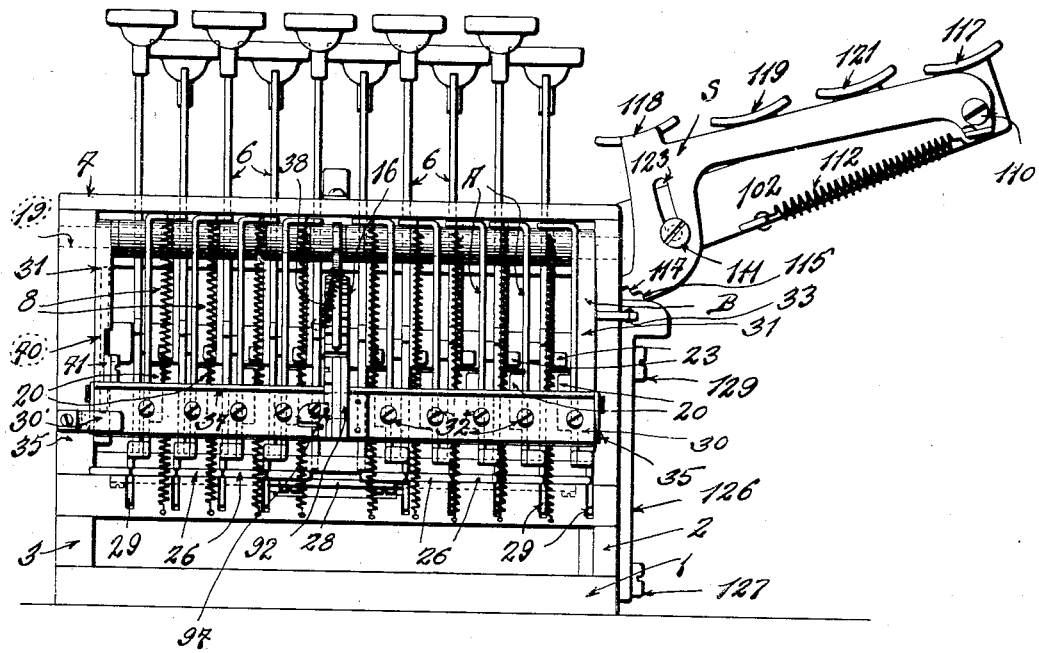
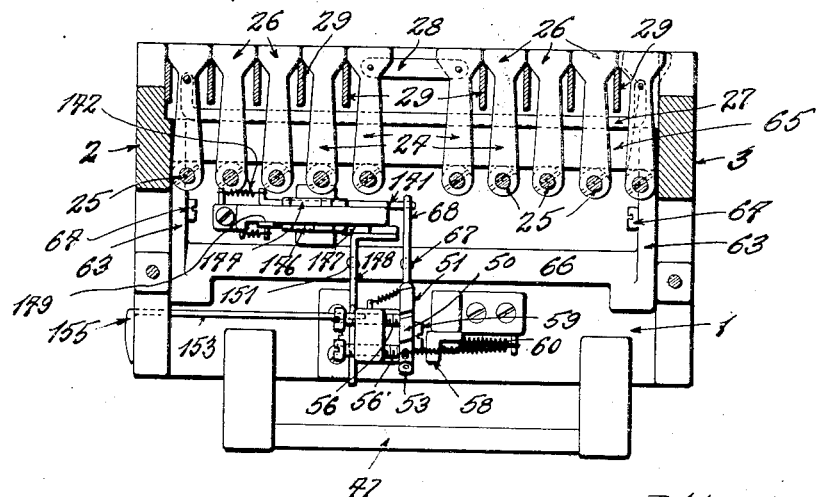

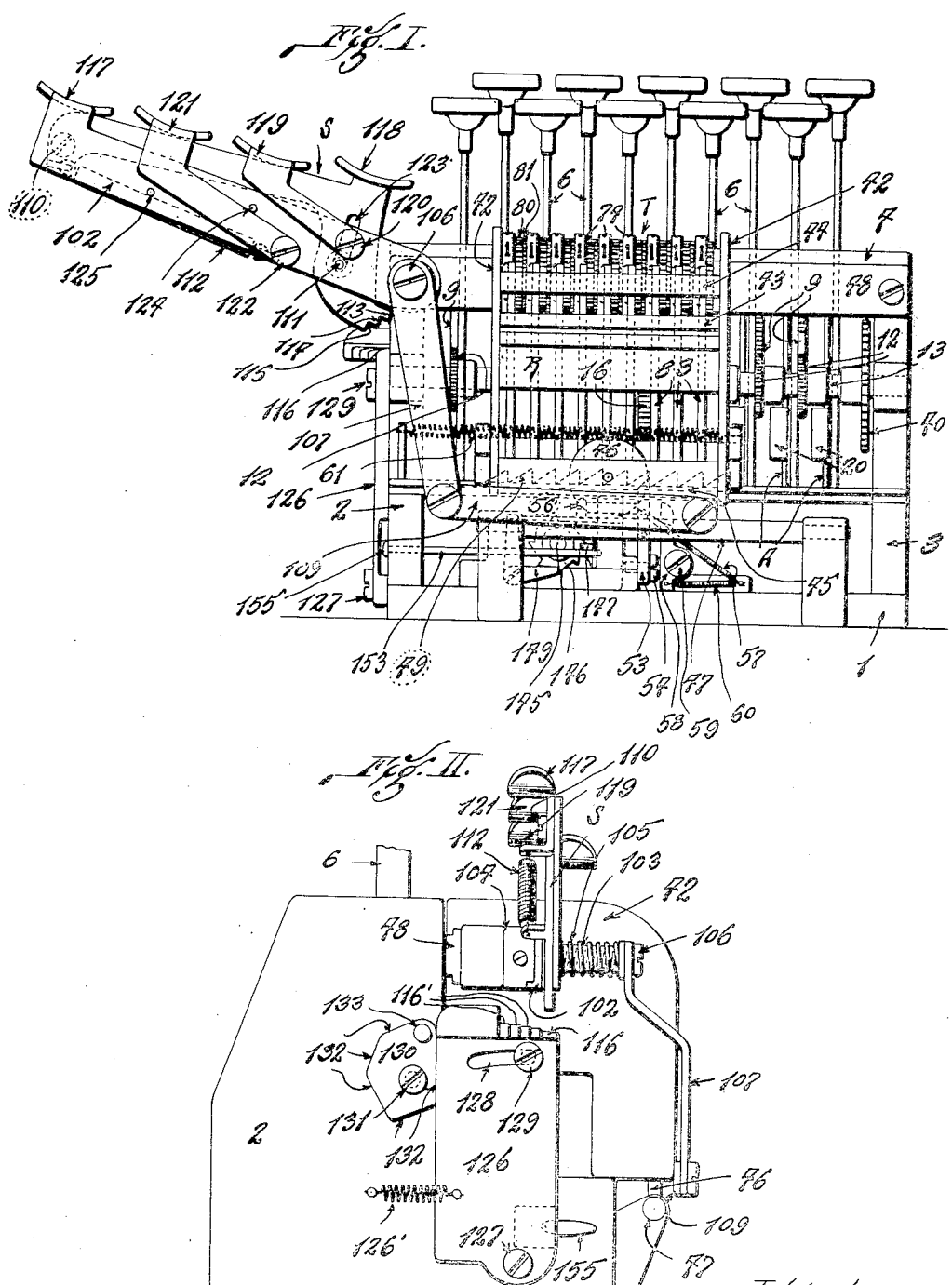

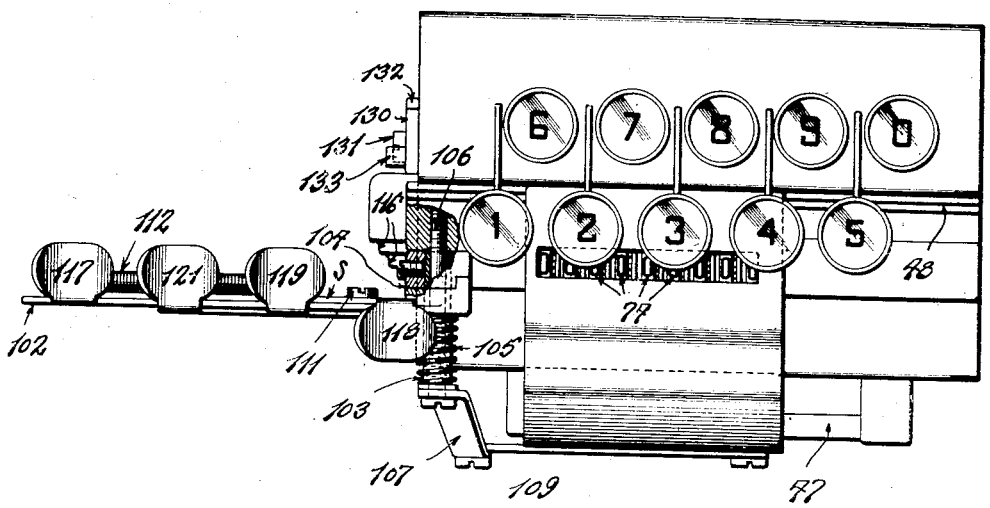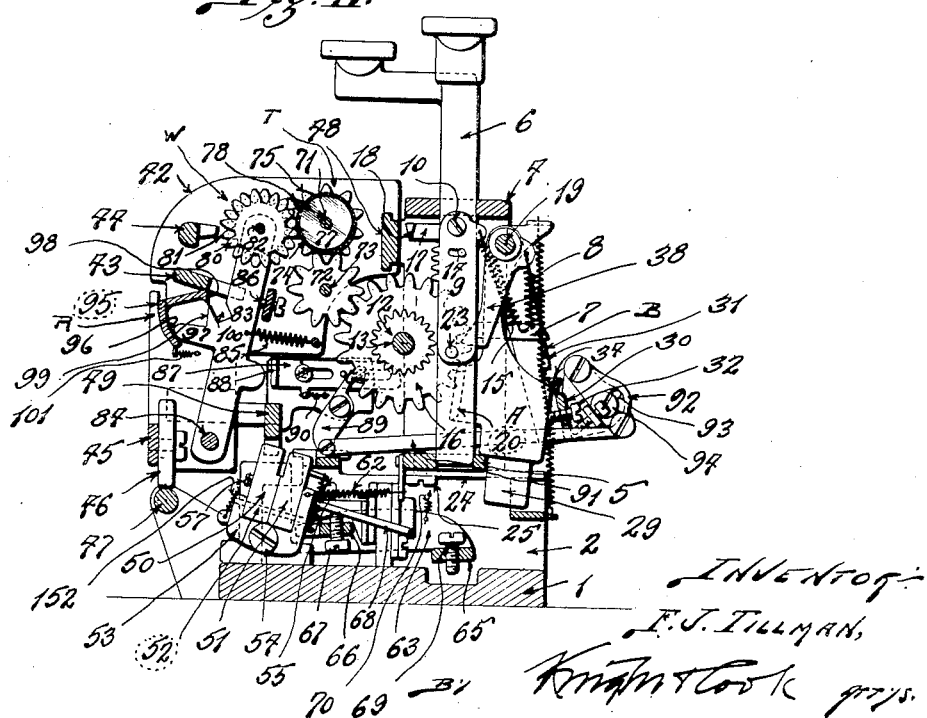

F. J. TILLMAN.
CALCULATING MACHINE.
APPLICATION FILED MAY 15, 1916.
1,394,800.
Patented Oct. 25, 1921.
7 SHEETS—SHEET 4.
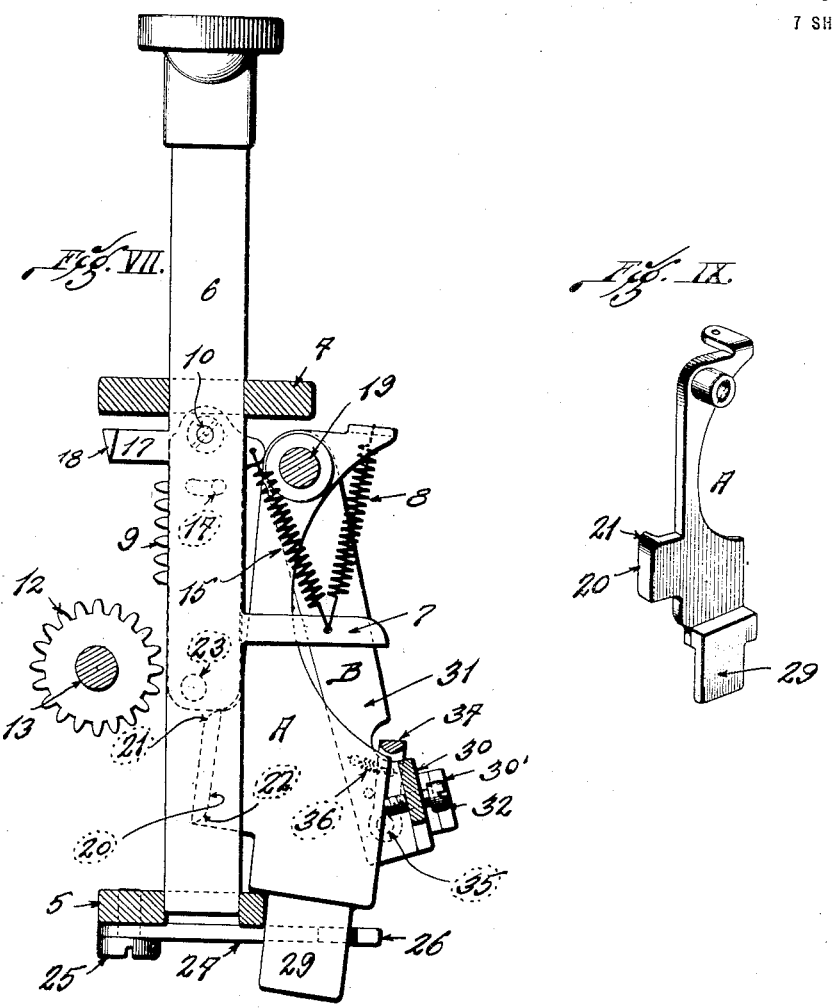
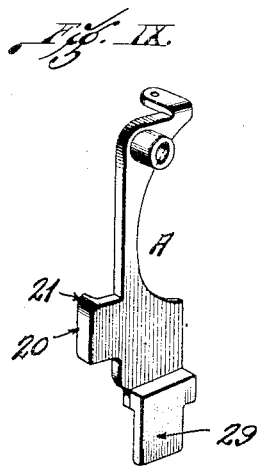
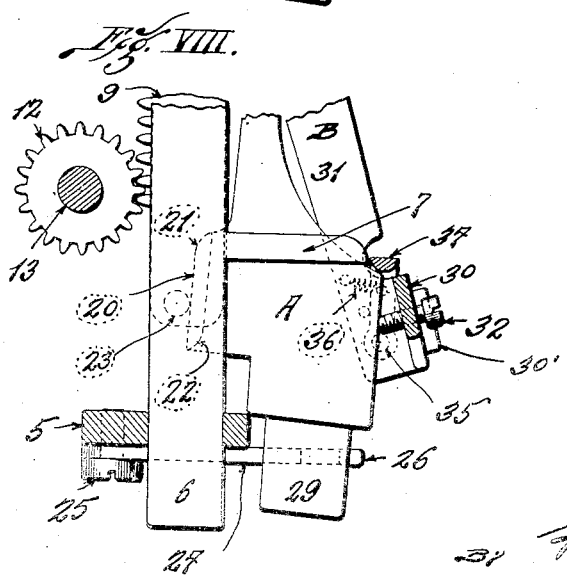

F. J. TILLMAN.
CALCULATING MACHINE.
APPLICATION FILED MAY 15, 1916.
1,394,800.
Patented Oct. 25, 1921.
7 SHEETS—SHEET 5.
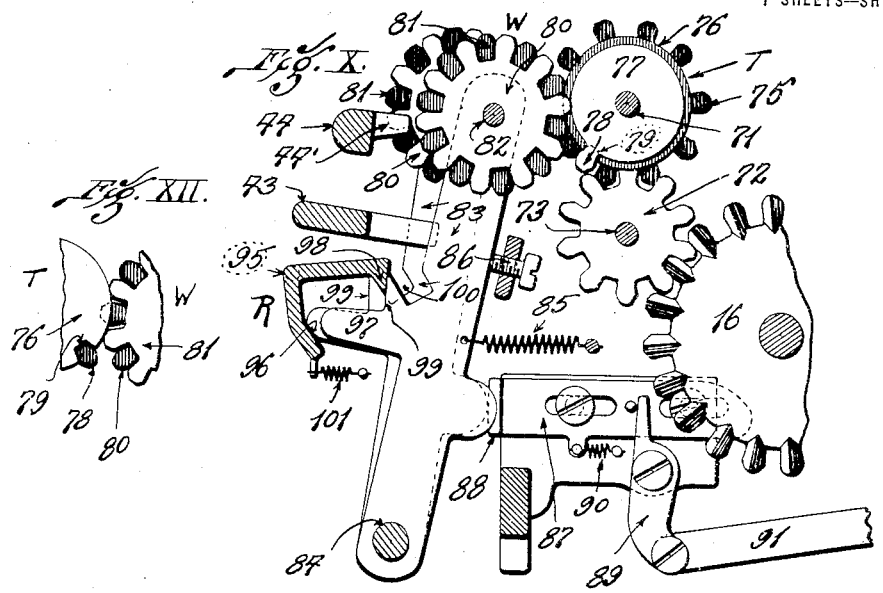
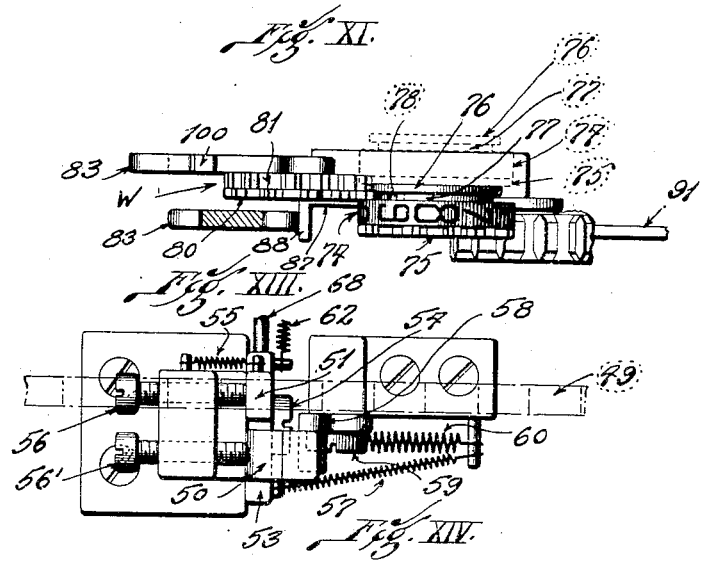
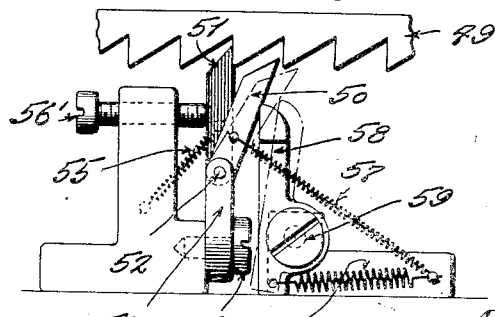

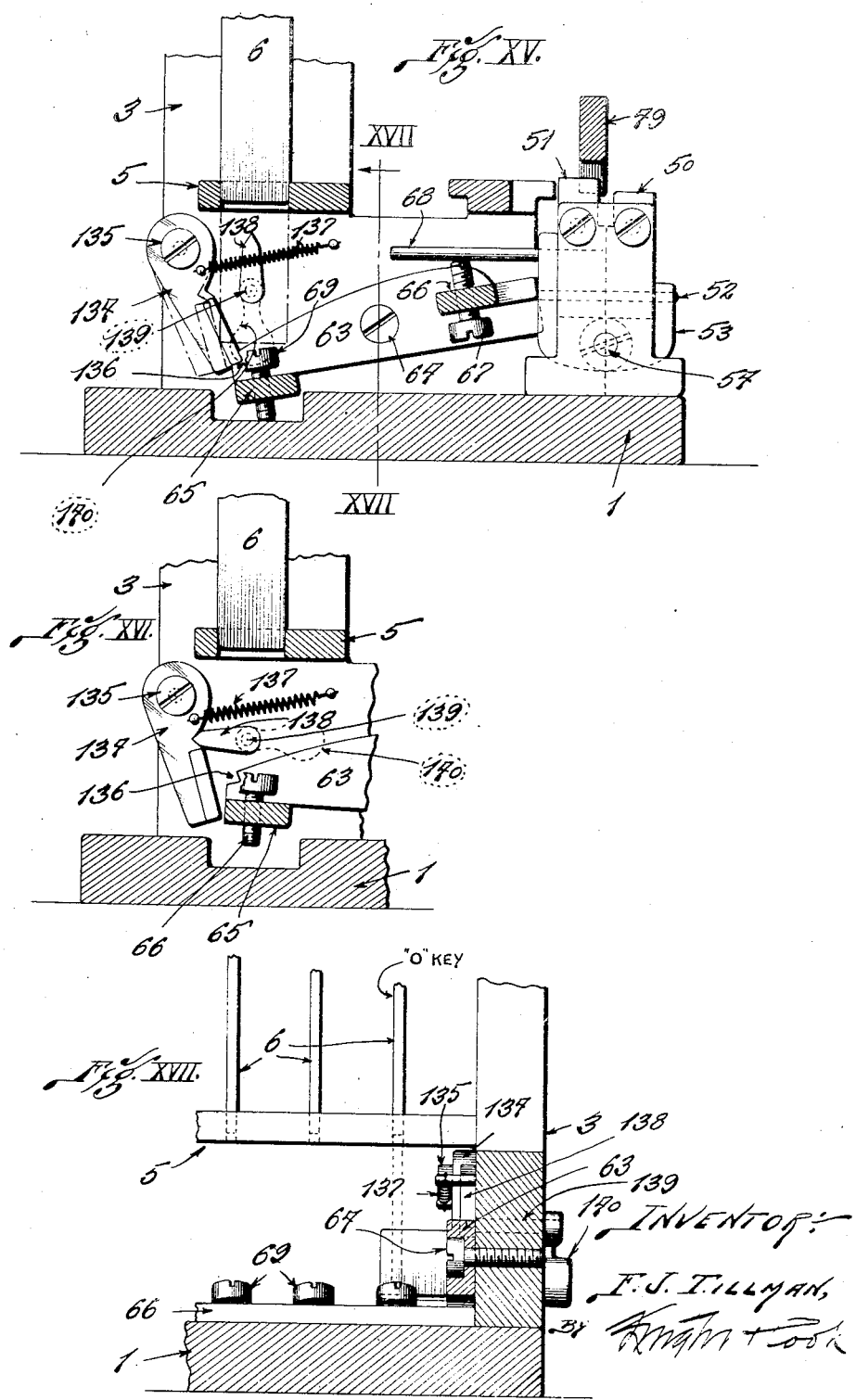

F. J. TILLMAN.
CALCULATING MACHINE.
APPLICATION FILED MAY 15, 1916.
1,394,800.
Patented Oct. 25, 1921.
7 SHEETS-SHEET 7.
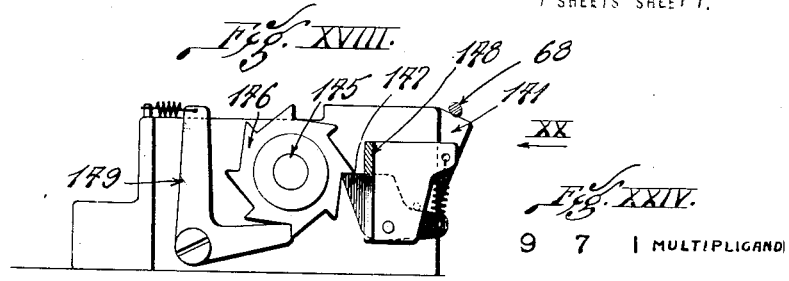
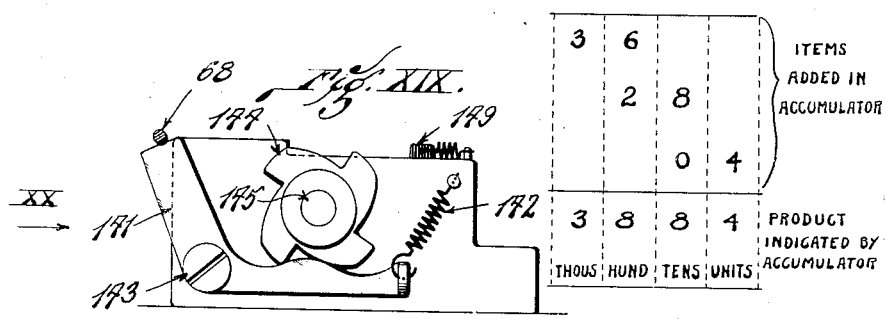
| | 9 | 7 | MULTIPLICAND |
|---|---|---|---|
| | | 4 | MULTIPLIER |
| 3 | 6 | | ITEMS ADDED IN ACCUMULATOR |
| | 2 | 8 | |
| | | 0 | 4 |
| 3 | 8 | 8 | 4 | PRODUCT INDICATED BY ACCUMULATOR |
| THOUS | HUND | TENS | UNITS | |
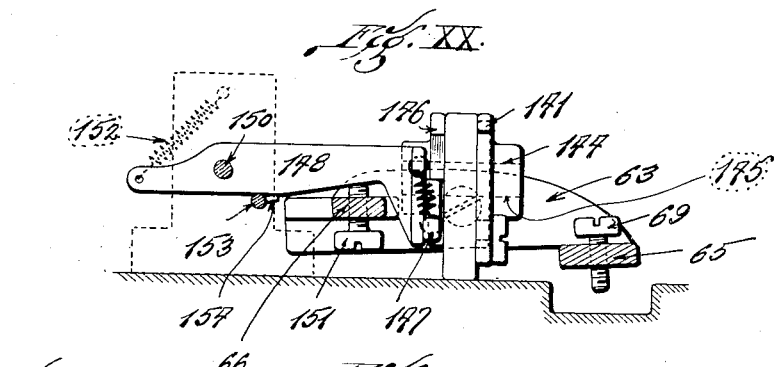
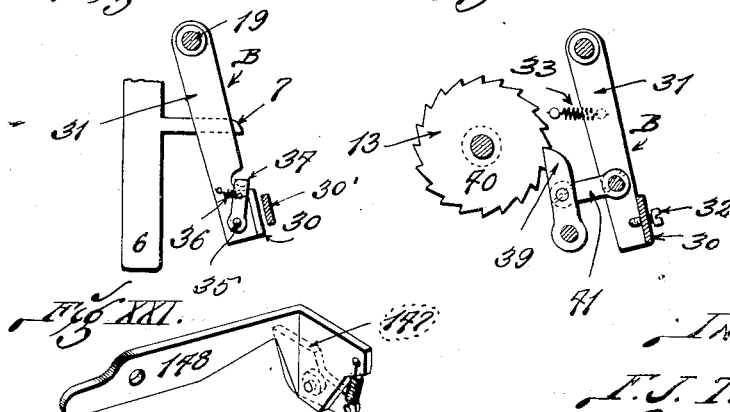
INVENTOR
F. J. Tillman,
BY Knight & Cook
ATTYS.

UNITED STATES PATENT OFFICE.

FERDINAND J. TILLMAN, OF ST. LOUIS, MISSOURI.

CALCULATING-MACHINE.

1,394,800.   Specification of Letters Patent.   Patented Oct. 25, 1921.

Application filed May 15, 1916. Serial No. 97,641.

*To all whom it may concern:*

Be it known that I, FERDINAND J. TILLMAN, a citizen of the United States of America, a resident of the city of St. Louis, State of Missouri, have invented certain new and useful Improvements in Calculating-Machines, of which the following is a full, clear, and exact description, reference being had to the accompanying drawings, forming a part of this specification.

My invention relates to improvements in calculating machines, one of the objects being to produce a simple, inexpensive and absolutely accurate calculating machine. Another object is to produce an adding machine having a traveling carriage movable step by step in response to successive key operations to provide for the addition of numbers of different orders, and also adapted to be retained in a fixed position during several key operations to provide for the addition of several numbers of the same order. In adding long columns of numerals, the operator may add all of the numerals of the same order without operating the traveling carriage, and upon the completion of the operation of adding a series of numerals of one order, the carriage may be advanced one or more steps and again retained in a fixed position while a series of keys are depressed to add numerals of another order.

A further object is to produce a calculating machine provided with a simple and inexpensive multiplying device.

Another object is to provide a simple selective carriage moving device for shifting the carriage to different predetermined positions.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a front elevation of a calculating machine constructed in accordance with the invention.

Fig. II is a side elevation of the machine.

Fig. III is a plan view partly in section.

Fig. IV is a vertical section taken approximately through the middle of the machine.

Fig. V is a rear elevation of the machine.

Fig. VI is a horizontal section showing the escapement and key locking device at the lower portion of the machine.

Fig. VII is an enlarged detail view partly in section showing one of the keys and some of the key actuated devices associated therewith.

Fig. VIII is a fragmentary view of the parts shown at the lower portion of Fig. VII, illustrating said parts in the position they occupy when the key is moving downwardly to actuate the counting wheels.

Fig. IX is a perspective view of one of the key actuated shifters.

Fig. X is an enlarged fragmentary view showing the master wheel, the accumulator and the means for locking and unlocking the accumulator wheels.

Fig. XI is a fragmentary plan view showing the master wheel, a total wheel and the transferring wheels associated with said total wheel.

Fig. XII is a detail view showing a portion of the transferring device.

Fig. XIII is a plan view of the escapement device, the rack bar which lies above the escapement dogs being shown by dotted lines.

Fig. XIV is a front elevation of the parts shown in Fig. XIII.

Fig. XV is an enlarged vertical section showing the escapement device and the means for retaining said device in an inoperative condition to prevent the carriage from advancing in response to the key operations.

Fig. XVI is a fragmentary view of the parts at the left side of Fig. XV, showing the locking device in the position it occupies when the escapement is free to move in response to the key operations.

Fig. XVII is a vertical section taken approximately on the line XVII—XVII, Fig. XV.

Fig. XVIII is a detail view of the multiplying attachment whereby the escapement is locked during alternate key operations.

Fig. XIX is a view of the multiplying attachment looking in a direction opposite to that from which the parts are viewed in Fig. XVIII.

Fig. XX is a view of the multiplying attachment looking in the direction indicated by the arrows XX in Figs. XVIII and XIX.

Fig. XXI is a perspective view of the pawl carrying arm forming part of the multiplying attachment.

Fig. XXII is a detail view showing the locking bar whereby each key, excepting the "0" key, is prevented from being depressed a second time before returning to its normal or starting position.

Fig. XXIII is a detail view of the means for locking the counting shaft or main shaft.

Fig. XXIV is an example illustrative of the manner of using the multiplying attachment.

Briefly stated, the machine I have shown to illustrate a preferred form of the invention, comprises ten keys bearing the characters 0 to 9 inclusive, counting wheels or transmission wheels fixed to a transmission shaft, and a series of different rack bars for transmitting movement from the keys to said counting wheels. The strokes of the different keys are uniform, but the rack bars are so constructed that a stroke of the "1" key will advance the counting wheels one step, the "2" key two steps, etc. A master wheel, operable in response to movements of the counting wheels, is adapted to transmit movement to the accumulator. The accumulator is mounted in a traveling carriage movable step by step to provide for the transmission of movement from the single master wheel to the different total wheels.

The machine is also provided with a number of other devices including a selective carriage moving device having a series of keys adapted to be depressed for the purpose of shifting the carriage to predetermined positions; means for rendering the escapement device inoperative to prevent the carriage from moving in response to movements of the numeral keys; and a multiplying attachment which allows the carriage to advance only one step in response to two key operations as will be hereinafter fully described.

The main frame comprises a base 1, side members 2 and 3 extending upwardly from said base, an upper key guide 4 connecting the upper ends of said side members, and a lower key guide 5 arranged below said upper key guide. The ten keys are provided with characters 0 to 9 inclusive, as shown in Fig. III. Each key is provided with a vertical stem 6 fitted to and adapted to reciprocate in the key guides 4 and 5. Each key stem 6 is provided with a finger 7 (Figs. IV and VII) to which a restoring spring 8 is connected. The restoring springs tend to retain the keys in their elevated positions. Each key stem 6, excepting the stem of the 0 key, is provided with a rack bar 9 (Figs. IV, VII and VIII) each rack bar being pivoted to a key stem at 10 so that the rack teeth may be shifted into and out of alinement with the adjacent counting wheel 12 on the counting shaft 13. Stop pins 14, are secured to the key stems to limit the oscillatory movements of the rack bars. Springs 15 connecting the rack bars to the fingers 7 tend to retain the rack teeth in alinement with the teeth on the counting wheels 12.

All of the counting wheels 12 are fixed to the counting shaft or transmission shaft 13, and each counting wheel is associated with one of the rack bars 9 to provide for the transmission of movements from one of the keys to the accumulator, the different rack bars being so constructed and arranged that the rack bar associated with the "1" key will advance the counting shaft 13 one step, the rack bar associated with the "2" key having a sufficient number of teeth to advance the counting shaft two steps, etc.

When the keys occupy their normal or starting positions all of the rack bars 9 are in vertical alinement with the teeth on the counting wheels 12, and any one of the keys may be selected and depressed with the result of advancing the counting wheels 12 and counting shaft 13 a predetermined number of steps. A master wheel 16 (Fig. IV) fixed to the counting shaft 13, is adapted to transmit movement from said counting shaft to the accumulator, said accumulator being mounted in a traveling carriage which advances step by step in response to the key operations so as to provide for the transmission of movement from the master wheel 16 to the different total wheels, as will be hereinafter described.

Each key stem 6, excepting the stem of the "0" key, is provided with a stop arm 17 (Figs. IV and VII) having a stop tooth 18 adapted to pass between and interlock with two of the teeth on a counting wheel 12 when the key stem reaches its lowermost position, thus preventing the counting wheels from advancing more than a predetermined distance in response to a key operation.

The means for shifting the rack bars 9 out of engagement with the counting wheels 12 includes a series of shifters A depending from a pivot rod 19 at the rear of the machine, see Figs. IV, VII and IX. Each shifter is associated with one of the rack bars 9, the shifter being provided with a lug 20 having cam faces 21 and 22 (Figs. VII and VIII) and the adjacent rack bar being provided with a pin or roller 23 adapted to engage said cam faces. The springs 8 which tend to retain the key stems in their elevated positions, are connected to extensions at the upper ends of the shifters A, and it will be apparent that these springs also tend to retain each shifter A in the position shown in Fig. VII.

When a key stem 6 and its rack bar 9 moves downwardly the pin 23 on the rack bar will strike the cam face 21 of a shifter A at the beginning of such movement (Fig. VII), thus moving the shifter A rearwardly and at the same time placing the spring 8 under a gradually increasing tension so as to positively retain the rack teeth in engagement with the adjacent counting wheel 12 while the pin 23 travels downwardly along the straight front face of the cam lug 20, as shown in Fig. VIII. Upon the completion of the downward stroke of a key the pin 23 is located in a plane below the lower end of the cam lug 20 and this releases the shifter A so that it may be restored to its normal position by the spring 8, thereby locating the cam face 22 in a plane directly above the pin 23. At the beginning of the upward or return movement of the key the pin 23 strikes the cam face 22 so as to shift the pivoted rack rearwardly and away from the counting wheel 12. During the continued upward movement of the key stem and rack, the pin 23 travels along the straight rear face of the cam lug 20 to retain the rack teeth out of engagement with the counting wheel, and immediately before the key stem reaches its normal or starting position, the pin 23 passes over the upper end of cam lug 20 and the rack is then restored to its normal position by the spring 15.

I will now describe the key locking device for preventing more than one key from being depressed at the same time. A series of horizontal abutment arms 24 (Figs. VI, VII and VIII) fitted to vertical pivot members 25, are provided with abutment heads 26 which lie very close to each other. The abutment arms 24 at the ends of the row are connected by a bar 27 (Fig. VI), two of the intermediate abutment arms being separated some distance from each other and connected together by a bar 28. Each abutment arm 24 is normally free to move a very slight distance, and by referring to Fig. VI it will be noted that the abutment arms are so arranged that if two adjacent abutment heads 26 are forced away from each other the remaining abutment heads will be forced into engagement with each other. The shifters A are provided with extensions 29 (Figs. VI, VII and IX) which lie between the abutment arms 24. When a key is depressed one of the shifters A is forced rearwardly at the beginning of the key movement, as previously described, and at this time the extension 29 on the shifter passes between two of the abutment heads 26 so as to force the other abutment heads into engagement with each other, thus preventing all of the other shifters A from moving rearwardly while the key is moving downwardly. The selected key is free to continue its downward movement but the remaining keys are locked in their elevated positions by the abutment arms 24 which then engage each other to prevent the shifters A from moving rearwardly thus locking the shifters associated with the elevated keys in positions where their cam lugs 20 will lie in paths of the pins 23 on the elevated racks. When the selected key reaches the end of its downward stroke the shifter is restored to its normal position, thus withdrawing the extension 29 from the abutment heads 26 so that another key may be selected and operated while the first mentioned key is returned to its elevated position.

In this connection it is important to note that the rack bars 9 are released from the counting wheels and held in inoperative positions during return strokes of the keys, and that the key locking device, consisting of the abutment arms 24 and the shifter extensions 29, is unlocked upon the completion of the operative or downward stroke of a key. Therefore, a second key may be depressed to actuate the counting wheels while another key is returning to its elevated position. This allows the operator to actuate the keys very rapidly by selecting and depressing a key while another key is returning to its elevated position.

An unlocking frame B, located at the rear of the machine, comprises a cross bar 30 and a pair of arms 31 extending upwardly from the ends of said cross bar. This unlocking frame is pivotally supported by the pivot rod 19 which passes through the upper ends of the arms 31. The cross bar 30 is provided with a series of adjustable abutment screws 32 each of which engages the rear edge of one of the shifters A, as shown in Figs. IV and VII. 33 designates a restoring spring (Figs. V and XXIII) tending to pull the lower portion of the unlocking frame toward the front of the machine. When a key is depressed one of the shifters A moves rearwardly from the position shown in Fig. VII to the position shown in Fig. VIII, and since each shifter normally engages one of the abutment screws 32 on the unlocking frame B it will be apparent that the unlocking frame will swing backwardly from the position shown in Fig. VII to the position shown in Fig. VIII at the beginning of each key operation and that it will remain in the position seen in Fig. VIII until the downward stroke of the key is completed. The unlocking frame B has several functions which will be hereinafter described.

The rearward movement of the unlocking frame B is limited by a stationary stop member 30' (Figs. V, VII, VIII and XXII).

When one of the racks 9 is engaged with a counting wheel 12 (Fig. VIII) the frame B engages the stop member 30, so as to prevent the shifter A and the depressed rack bar from moving rearwardly from the position seen in Fig. VIII, thus retaining the rack teeth in mesh with the counting wheel.

The means for preventing each key (excepting the "0" key) from being depressed a second time before returning to its normal position comprises a stop bar 34 (Figs. IV, V, VII and XXII) extending across the rear of the machine and normally located in the paths of the fingers 7 which extend rearwardly from the key stems. The stop bar 34 is provided at its ends with a pair of downturned arms which are pivotally connected to the unlocking frame at 35. A restoring spring 36 (Figs. VII and XXII) connecting the stop bar to the unlocking frame B, tends to retain said stop bar in a fixed position with respect to the unlocking frame. At the beginning of each key operation when the unlocking frame B is shifted rearwardly it carries the stop bar 34 from the position shown in Fig. VII to the position seen in Fig. VIII, thereby locating the stop bar in a plane beyond the paths of the fingers 7. When a key reaches the end of its downward stroke the unlocking frame B and stop bar 34 are restored to the positions shown in Fig. VII, wherein the stop bar lies in the vertical path of the key finger 7. The stop bar will yield freely to allow the finger 7 to move upwardly and return to its normal position when disengaged from said finger. After the finger 7 passes the stop bar 34 and continues its upward movement, the key associated therewith cannot be depressed to its lowermost position until it is restored to its normal or starting position. This is due to the fact that the stop bar 34 will lie in the paths of the fingers 7 during the return movements of the keys, and if a key is depressed before reaching its starting position the finger 7 associated with said key will strike the stop bar 34 so as to notify the operator that the key operation was ineffective and that the key must be allowed to return to its normal position before the selected key will actuate the counting wheels. After the key has been restored to its starting position it may then be depressed with the result of moving the shifter A and stop bar 34 to the positions shown in Fig. VIII, wherein the stop bar does not prevent the key finger 7 from moving downwardly. From the foregoing it will be understood that the function of the stop bar 34 is to prevent the operator from making a mistake by depressing a key a second time during the return stroke of the key when the rack bar 9 is held out of engagement with the adjacent counting wheel 12.

When all of the keys occupy their elevated or normal positions, the counting shaft 13 is locked and prevented from turning in either direction by a pawl 38 which engages the master wheel 16, as shown in Fig. IV, and a pawl 39 (Fig. XXIII) which engages a ratchet wheel 40 on the counting shaft 13. The ratchet wheel 40 is shown in Figs. I and XXIII. The pawl 38 which engages the master wheel 16 (Fig. IV) prevents the retrograde movement of the counting shaft, and the pawl 39 (Fig. XXIII) normally prevents the shaft from turning in the opposite direction. The means for releasing the pawl 39 includes a link 41 (Fig. XXIII) connecting said pawl to the unlocking frame B, it being understood that the unlocking frame moves rearwardly at the beginning of each key operation and that it remains in its rearward position until the key has completed its operative or downward stroke. Hence the counting wheels are unlocked during the operative strokes of the keys and locked at all other times.

The accumulator carriage comprises side members 42 (Figs. I, II and IV) connected together by a comb bar 43, a stop bar 44 and a wheel holding bar 45. 46 designates a wheel secured to the bar 45 and rotatably mounted on a stationary track 47. A stationary track or guide bar 48 (Figs. I and IV) is interlocked with the upper portions of the side members 42 of the accumulator carriage. This carriage is adapted to move in a horizontal path and it is supported and guided by the tracks 47 and 48. A ratchet bar 49, fixed to the accumulator carriage, (Figs. I and IV) is provided with ratchet teeth adapted to engage escapement dogs 50 and 51. Both escapement dogs are secured, by means of a pivot pin 52, to an oscillatory dog carrier 53, the latter being supported by a pivot screw 54. A spring 55 (Figs. VI, XIII and XIV) tends to pull the escapement dog 51 into engagement with a stop screw 56, as shown most clearly in Figs. XIII and XIV. A spring 57 tends to pull the escapement dog 50 away from a stop screw 56' (Figs. XIII and XIV). 58 designates a yieldable stop arm pivotally supported at 59, and 60 designates a spring tending to retain said stop arm in the position shown in Figs. I and XIV wherein its lower end engages the base of the machine. The movement of the stop arm in one direction is limited by the base of the machine, but said arm may be moved from the position shown by full lines in Fig. XIV to the position shown by dotted lines so as to allow the carriage to be restored by hand as will be hereinafter described. The spring 60 connected to the stop arm 58, is stronger than the spring 57 which is connected to the pawl 50, the object being to prevent the spring 57 from shifting the stop member 58 when the pawl 50 occupies the position shown by full lines in Fig. XIV.

When all the keys are elevated the escapement dogs 50 and 51 are alined with each other as shown in Figs. I, IV and VI, instead of being offset as shown in Figs. XIII and XIV and a tooth on the ratchet bar 49 engages the pawl 50. At this time a carriage feeding spring 61 (Fig. I) tends to pull the carriage to the left, and the tension of this spring is great enough to pull the escapement dog 50 into engagement with the stop screw 56' against the resistance offered by the light spring 57 which tends to pull said dog away from the stop screw. When a key is depressed, certain key actuated devices are operated to shift the escapement dog holder 53 from the position shown in Fig. IV to the position shown in Figs. XIII and XIV thereby releasing the dog 50 from the rack 49 and engaging the dog 51 with said rack. When the dog 50 is released from the rack it is shifted to the position shown in Fig. XIV by the spring 57. The carriage is restrained momentarily by the dog 51 and ratchet bar 49. During the return movement of the selected key, the escapement dog holder 53 is returned from the position shown in Figs. XIII and XIV to the position shown in Fig. IV, and during this return movement the dog 51 passes from one of the rack teeth while the dog 50 is in alinement with the next adjacent rack teeth, and this allows the carriage to advance one step, the escapement dogs being positioned as shown in Figs. IV and VI upon the completion of such movement. At this time the spring 61 (Fig. I) tending to pull the carriage and its ratchet bar 49 to the left, forces the escapement dog 50 into engagement with the stop screw 56'.

The carriage may be restored manually by moving it to the right while either of the escapement dogs 50—51 is engaged with the ratchet bar 49. If the dog 50 is engaged with the ratchet bar it will be forced to the position shown by dotted lines in Fig. XIV when the carriage and its ratchet bar 49 moves to the right. The stop arm 58 will yield to allow the dog 50 to occupy the position shown by dotted lines in Fig. I when the points of the ratchet teeth pass over the point of said dog 50, and when the carriage is released, the carriage feeding spring 61 which tends to move the ratchet bar 49 to the left, will move the carriage and ratchet bar until the escapement dog 50 is forced into engagement with the stop screw 56'. If the operator restores the carriage and its ratchet bar 49 while the ratchet bar is engaged with the escapement dog 51, the spring 55 will yield to allow the dog 51 to move away from the stop screw 56 when the teeth of ratchet bar 49 pass over the point of said dog 51, and when the operator releases the carriage, it will be stopped by dog 51 and ratchet bar 49 which will then occupy the positions shown in Figs. XIII and XIV.

The means for oscillating the escapement dog holder 53 to permit the carriage to move step by step comprises a spring 62 (Fig. IV) tending to pull said holder to the right and an oscillatory operating frame adapted to move said holder to the left from the position shown in Fig. IV. This operating frame comprises a pair of side arms 63 (Figs. IV, VI and XV) pivotally connected at 64 to the side members of the main frame, a rear bar 65 connecting the rear ends of said arms 63 and a front bar 66 connecting the front ends of said arms. The front bar 66 is provided with an abutment screw 67 adapted to engage an arm 68 which extends rearwardly from the escapement dog holder 53, as shown most clearly in Figs. VI and XV, said arm 68 being rigidly secured to the escapement dog holder. The rear bar 65 is provided with a series of abutment screws 69 each of which is in vertical alinement with one of the key stems 6. When a key is depressed the lower end of its stem 6 strikes one of the abutment screws 69 (Figs. IV and VX) so as to move the rear frame bar 65 downwardly. Since the escapement frame is pivotally supported between its rear bar 65 and front bar 66, it will be understood that when the rear bar 65 moves downwardly the front bar 66 will move upwardly. The abutment screw 67, moving upwardly with the front bar 66 will transmit movement through the arm 68 to the escapement dog holder 53, thereby moving said holder 53 on the axis of its pivot to disengage the escapement dog 50 from the ratchet bar 49 and to engage the escapement dog 51 with said ratchet bar as previously described. At the beginning of the return stroke of the depressed key, a spring 70 will restore the escapement operating frame to the position shown in Fig. IV, and the spring 62 will restore the escapement dog holder 53.

When the machine is used as an ordinary adding machine the escapement will be actuated in response to each key operation and the accumulator carriage will advance step by step to provide for the transmission of movement from the master wheel 16 to the different total wheels.

The accumulator I have shown is provided with nine total wheels T loosely mounted on a shaft 71, the latter being secured to the side members 42 of the traveling accumulator carriage; nine transmission wheels 72 each of which meshes with one of the total wheels T said wheels 72 being loosely mounted on a horizontal shaft 73. The master wheel 16 (Figs. IV and X) is adapted to mesh with any one of the transmission wheels 72, and as the carriage advances step by step the transmission wheels 72 are brought into mesh, consecutively, with said master wheel 16. Each total wheel T (Figs. IV, X, XI and XII) comprises four elements, namely, an indicator wheel 74 provided with the characters 0 to 9 inclusive, a gear wheel 75 fixed to one side of said indicator wheel, a notched disk 76 fixed to the opposite side of said indicator wheel, a smaller disk 77 having a single tooth 78 being interposed between the indicator wheel and the notched disk. The single tooth 78 is alined with the notch 79 in the disk 76, as shown most clearly in Fig. XII. Each transmission wheel 72 (Figs. IV and X) meshes with one of the toothed wheels 75.

The transferring device includes a series of double wheels W each of which is associated with two adjacent total wheels to provide for the transmission of movement from the single tooth 78 of one total wheel to the adjacent total wheel. Each wheel W consists of a pair of wheels 80 and 81 fixed to each other and loosely mounted on a shaft 82, said shaft being fixed to the upper end of a carrier arm 83. Each of the wheels 80—81 has ten teeth, and two of the teeth of wheel 81 normally engage the periphery of one of the notched disks 76, as shown in Fig. XII to prevent the accumulator wheels from rotating. When a transferring tooth 78 passes between two of the teeth on a transferring wheel 80, one of the teeth on the adjacent wheel 81 will enter the notch 79 (Fig. XII) to unlock the double transferring wheel, thus allowing it to advance one step while the single tooth 78 is in mesh with the wheel 80. This movement is transmitted from the wheel 80, through the wheel 81 to the adjacent wheel 75 of the next higher order. The transferring wheel 81 (Fig. XI) is thick enough to engage one of the notched disks 76 and at the same time mesh with the adjacent toothed wheel 75. It will also be noted that the teeth of each transferring wheel 80 is alined with the space between the teeth of the companion wheel 81, the object being to lock the transferring device by locating two teeth of wheel 81 on the periphery of a disk 76 (Fig. X) while the teeth of wheel 80 are so arranged that they will mesh with the single transferring tooth 78.

Since all of the total wheels are normally locked by the double transferring wheels W, it is necessary to disengage a double wheel W from the selected total wheel immediately before the calculating operation. To accomplish this each double wheel W is carried by a shifter arm 83 (Figs. I, IV, X and XI) said shifter arms being movable independently of each other and pivotally supported by a pivot rod 84 fixed to the accumulator carriage. 85 designates restoring springs (Figs. IV and X) tending to retain the shifter arms 83 in engagement with stop screws 86. The different shifter arms 83 are slidably fitted to the comb bar 43 (Figs. I and IV).

The means for shifting the arms 83 comprises a horizontally movable bar 87 (Figs. IV, X and XI) provided with an offset end member 88 which lies directly in front of the master wheel 16. Instead of being secured to the carriage, the horizontally movable bar 87 is slidably fitted to a stationary part of the machine and it is adapted to be actuated through the medium of an operating lever 89 having a finger which engages a pin on said bar 87. 90 designates a restoring spring (Fig. X) tending to retain the last mentioned pin in engagement with the finger on the operating lever 89. This operating lever is connected through the medium of a long bar 91 (Figs. IV and X) and an adjusting device 92 to the bar 30 on the oscillatory unlocking frame at the rear of the machine. The adjusting device 92 (Fig. IV) comprises an arm having a slot 93 and a screw 94 passing through said slot to secure the arm to an extension on the bar 30. It will be remembered that the unlocking frame, provided with the bar 30, moves rearwardly at the beginning of each key operation and that it returns to its normal position upon the completion of the operative stroke of the key. Therefore, the connecting bar 91 (Figs. IV, X and XI) operating lever 89 and horizontal bar 87 are actuated to shift one of the arms 83 at the beginning of each key operation, thus unlocking the selected total wheel, and upon the completion of the operative stroke of the key, the arm 83 is restored by its restoring spring 85. When one of the double transferring wheels W is shifted to its inoperative position, as shown at the left in Fig. X, its wheel 81 will interlock with a tooth 44' on the toothed bar 44.

The different shifter arms 83 (Figs. I, IV and X) are locked in their different positions through the medium of a rockable retaining device R carried by the accumulator carriage and pivotally supported at 95. When the parts occupy their normal positions the retaining device R occupies the position shown in Fig. IV and any one of the shifters 83 may be selected and moved forwardly. The retaining device R is provided with an abutment face 96 adapted to be engaged by extensions 97 on the shifters 83 when the parts occupy the positions shown in Fig. IV. The retaining device is also provided with an abutment 98 adapted to engage an abutment face 99 on the shifter arms 83 and also adapted to enter notches 100 formed in said arms, as shown in Fig. X. When one of the shifters is moved forwardly by the horizontal bar 87, the extension 97 on the selected shifter engages the abutment face 96, so as to rock the retaining member R on the axis of its pivot 95, thereby lowering the abutment 98 to the position shown in Fig. X. The abutment 98 then lies immediately in front of the abutment faces 99 of all of the shifter arms 83, excepting the arm 83 that has been actuated to unlock the selected total wheels, and said abutment 98 lies in the notch 100 of the last mentioned arm, as shown in Fig. X. When the shifter arm 83 is restored, the retaining device R is returned by means of a spring 101 shown in Fig. X.

I will now describe the selective carriage moving device for shifting the accumulator carriage to different predetermined positions to provide for the transmission of movement to a total wheel of a predetermined order. An operating arm 102 (Figs I, II, III and IV) is loosely mounted on a sleeve 103 (Fig. III) a clutch member 104 being fixed to said sleeve and the operating arm 102 being provided with clutch teeth which coöperate with corresponding teeth on the clutch member 104. The operating arm 102 is slidably fitted to the sleeve 103 so that said arm may be released from the clutch member 104 and turned to a position immediately over the traveling carriage when the machine is not in service or when it is packed for shipment. However, when the machine is in service, a spring 105 (Figs. II and III) surrounding the sleeve 103, forces the operating arm 102 into interlocking engagement with the clutch member 104 so as to rigidly secure said operating arm 102 to the sleeve 103. This sleeve is loosely fitted to a stationary pivot screw 106. 107 designates an arm rigidly secured to the sleeve 103 and connected by means of a bar 109 to the traveling carriage. The carriage moving spring 61 (Fig. I) tends to move the carriage to the left and it is to be understood that the carriage may be moved to the right by depressing the operating lever 102.

A stop device S, in the form of an arm, is pivotally connected to the operating arm 102 by means of a screw 110. The movement of the stop device S is limited by a screw 111 passing through a slot in said device, as shown in Figs. I and V. 112 designates a spring tending to retain the stop device in its elevated position. Stop shoulders 113, 114 and 115 are formed on the free end of the stop device S said shoulders being stepped as shown in Fig. I, and adapted to coöperate with an abutment 116 to limit the movement of the operating arm 102. When the stop device occupies the position shown in Fig. I, the abutment 116 lies below the path of the stop shoulder 115, and the operating lever 102 may be actuated by depressing the a key 117 with the result of moving the carriage the maximum distance to the right.

The stop device S is movable on the axis of its pivot 110 to locate any one of the stop shoulders 113, 114 or 115 in a position where it will coöperate with the abutment 116 to limit the movement of the selective carriage moving device. The means for adjusting these stop shoulders comprises a finger key 118 formed on the stop device S; a finger key 119 located directly above the stop device S and pivoted at 120 to the operating arm 102; and a finger key 121 located directly above the stop device S and pivoted at 122 to the operating arm 102. When the finger key 118 is depressed, it will move freely until the top wall of slot 123 engages the screw 111. The stop shoulder 113 will then be depressed to its operative position, and a continued downward movement of the key 118 will cause the stop device S and operating arm 102 to turn on the axis of the screw 106 until the stop shoulder 113 engages the abutment 116. The carriage may be moved a greater distance by depressing the finger key 119. This key will move downwardly independently of the carriage until it strikes the stop pin 124 (Fig. I) and at this time the stop shoulder 114 will be located in a position where it will coöperate with the abutment 116 to limit the movement of the carriage. It is to be understood that the stop shoulders 113, 114 and 115 are adjusted during the initial movement of the selected finger key and that no movement is transmitted to the operating arm 102 until the stop shoulders are properly adjusted by the selected finger key. The key 121 is located near a stop pin 125 (Fig. I), and when this key is depressed the stop device S will move independently of the operating arm 102 until the stop shoulder 115 is located at a point where it will coöperate with the abutment 116. It will now be understood that the three stop shoulders 113, 114 and 115 are adapted to coöperate with the abutment 116 to stop the selective carriage moving device in three different positions.

The abutment 116 is formed on an abutment device 126 (Figs. I and II) pivotally supported at 127 and provided with an arcuate slot 128 for the reception of a screw 129 whereby it is clamped to the side frame member 2. In addition to having the abutment 116, the abutment device 126 is provided with a series of stepped abutments 116' located in different planes and adapted to coöperate with the stop shoulders 113, 114 and 115 on the stop device S. By loosening the screw 129 and turning the abutment device 126 on the axis of its pivot 127, any one of the abutments 116' may be located in the path of the stop device. Thereafter, the abutment device may be locked by tightening the screw 129.

To insure the required accuracy and to aid the operator in the adjustment of the abutment device 126, a gage 130 (Fig. II) is pivoted to the frame member 2 at 131 and provided with faces 132 which lie at different distances from the pivot 131. When the abutment device 126 is properly located in one of its five different positions, one of the gage faces 132 will engage said abutment device as shown in Fig. II. 133 designates an operating knob secured to the gage 130. A spring 126' tends to force the abutment device 126 into engagement with the gage 130.

In performing ordinary adding operations, the accumulator carriage moves one step in response to each key operation as is well understood in this art. To introduce the numerals 275 into the accumulator, the carriage is first shifted by operating the selective carriage moving device to locate the carriage in a position where the master wheel will actuate the hundreds wheel of the accumulator and the numerals are registered in their horizontal sequence by depressing the "2" key, "7" key, and "5" key, respectively.

Since the carriage must be shifted to a predetermined point before registering a horizontal row of numbers, considerable time and labor would be involved in adding long columns of numbers if the operations were performed in the usual manner, by registering the numbers in their horizontal sequence. My calculating machine is, therefore, so constituted that the carriage may be held in a predetermined position during consecutive operations of different keys to provide for the consecutive addition of many numbers of the same order. In adding long columns of figures, the carriage may be positioned to register the numerals of the highest order, and the keys representing such numerals may be depressed to add all of them without shifting the carriage. Thereafter, the carriage may be shifted one step and again held in position to provide for the addition of all of the numerals of the next lower order, these operations being repeated until all of the numerals in the vertical columns have been added. To accomplish this a locking pawl 134 (Figs. XV, XVI and XVII) pivoted at 135 is adapted to coöperate with the oscillatory escapement operating frame 63—66 to retain the escapement device in an inoperative condition. This frame is pivoted at 64 and in performing ordinary adding operations it oscillates in response to each key operation, the abutment screws 69 being located in the paths of the key stems 6 as previously pointed out. The locking pawl 134 is adapted to engage a shoulder 136 on the escapement operating frame as shown in Fig. XV so as to retain the abutment screws 69 in their lowermost positions, also retaining the escapement dog 51 in engagement with the ratchet bar 49. The numeral keys may then be depressed without actuating the escapement and all of the movements of the master wheel will be transmitted to a total wheel of a predetermined order.

A spring 137 tends to retain the pawl 134 in engagement with the shoulder 136. A detent arm 138, secured to a shaft 139, is adapted to engage the pawl 134 to retain the latter in the position shown in Fig. XVI. When in the last mentioned position, the pawl 134 is located beyond the path of the shoulder 136 and the escapement will then be actuated in response to each key operation. 140 designates an operating knob secured to the detent shaft 139 and adapted to drop by gravity to the position shown in Fig. XV when the detent arm 138 is released from the pawl 134.

When the parts occupy the position shown in Figs. XV and XVII the locking pawl 134 lies in the path of the stem 6 on the "0" key, and when this key stem is depressed to the position shown by dot and dash lines in Fig. XV it will shift the pawl 134 from the shoulder 136, thereby releasing the escapement-operating frame and allowing its rear end to move upwardly during the upward stroke of the "0" key. This will permit the traveling carriage to advance one step and when a numeral key is subsequently depressed the locking pawl 134 will automatically return to the position shown in Fig. XV wherein it will retain the escapement in an inoperative position until the "0" key is again depressed, or until the detent arm 138 is shfted to the position shown in Fig. XVI.

In adding long columns of numerals, the detent arm 138 is located in the position shown in Fig. XV, and after all of the numerals of one order have been added the "0" key is depressed to permit the carriage to move one step. The numerals of the next lower order are then added by depressing the numeral keys successively, the pawl 134 being automatically restored to the position shown in Fig. XV in response to the first key operation.

Before describing the multiplying attachment, I will briefly point out the results to be accomplished. Fig. XXIV illustrates a problem in multiplication involving a product of the thousands order. The multiplier and multiplicand are usually written on a sheet of paper and items to be added in the accumulation are obtained by a mental calculation on the part of the operator. In multiplying the traveling carriage remains at rest during alternate key operations, said carriage being advanced only one step in response to two key operations, as will be hereinafter described.

To obtain the product of the problem illustrated in Fig. XXIV, the operator first adjusts the carriage to a position wherein the master wheel will actuate the thousands wheel of the accumulator. The next step is a mental calculation, namely 4×9=36. The "3" and "6" keys are then depressed successively to introduce the item 36 into the accumulator, the numeral "3" being registered in the thousands order and the "6" being registered in the hundreds order. The traveling carriage moves one step in response to the operation of the "3" key and remains at rest during the operation of the "6" key. The operator then mentally performs the calculation 4×7=28 to obtain the next item. Thereafter the "2" key is depressed to add the numeral 2 in the hundreds order. The carriage advances one step in response to this key operation and the "8" key is then depressed without advancing the carriage. When the product of the mental calculation is less than ten, the operator must operate the "0" key to stop the carriage to the proper order before depressing the numeral key. In the example (Fig. XXIV) the last mental operation is 4×1=4, and to register this the "0" key is depressed to advance the carriage to the units order before depressing the "4" key.

The means for holding the escapement device in an inoperative condition during alternate key operations comprises a retaining lever 141 (Figs. IV, VI and XVIII) adapted to coöperate with the arm 68 which extends from the escapement dog holder 53. Under ordinary conditions the escapement dog holder is oscillated during each key operation by the transmission of movement from the abutment screw 67 to the arm 68 on the escapement dog holder. However, when the multiplying attachment is in service, the retaining lever 141 is shifted during alternate key operations to the position shown in Figs. VI, XVIII and XIX, when it will retain the arm 68 in its elevated position, thus preventing the abutment screw 67 from transmitting movement to the escapement dog holder during alternate key operations. The means for actuating the retaining lever 141 comprises a spring 142 (Fig. XIX) tending to retain said lever in the position shown in Figs. VI, XVIII and XIX, wherein it lies in the path of the arm 68. The retaining lever 141 is pivotally supported at 143 (Fig. XIX) and the spring 142 forces said lever into engagement with a shifter wheel 144. The shifter wheel 144 is fixed to one end of a rotatable shaft 145 (Figs. XVIII and XIX), a ratchet wheel 146 being fixed to the opposite end of said shaft. The ratchet wheel 146 is provided with eight teeth (Fig. XVIII) and the shifter wheel 144 is provided with four teeth. If the shifter wheel 144 is turned one-eighth of a revolution from the position shown in Fig. XIX, it will turn the retaining lever 141 on the axis of pivot 143 so as to move the upper end of said lever out of the path of the arm 68, and if this movement is followed by a continued movement of one-eighth of a revolution the retaining lever 141 will be restored to the position shown in Fig. XIX wherein it lies in the path of arm 68. When the multiplying attachment is in service the shifter wheel 144 is advanced one-eighth of a revolution in response to each key operation, and during alternate key operations said shifter lever will be moved to the position shown in Fig. XIX while the arm 68 is elevated. The shifter lever will then prevent the arm 68 and escapement dog carrier from returning to their normal or starting positions until another key is depressed. The shifter wheel 144 is driven through the medium of the eight tooth ratchet wheel, both of said wheels being fixed to the same shaft and the ratchet wheel being turned one-eighth of a revolution during each key operation. The ratchet wheel 146 is driven through the medium of a pawl 147 pivoted to a pawl carrying arm 148, shown most clearly in Fig. XXI. A retaining pawl 149 (Fig. XVIII) prevents the ratchet wheel from turning backwardly. The pawl carrying arm 148 is pivotally supported at 150 (Fig. XX) and it extends over an abutment screw 151 on the oscillatory escapement operating frame, as shown most clearly in Figs. VI and XXII. A spring 152 tends to retain the pawl carrying arm 148 in engagement with the abutment screw 151. It is to be understood at this time that the escapement operating frame oscillates in response to each key operation with the result of imparting an oscillatory movement to the pawl carrying arm 148 thereby advancing the ratchet wheel 146 and shifter wheel 144 one-eighth of a revolution during each key operation.

The multiplying attachment may be rendered inoperative by holding the pawl carrying arm 148 in an elevated position wherein it will not be actuated by the escapement operating frame. 153 designates a rockable shaft (Figs. I, VI and XX) extending from one of the main side frame members to a point directly below the pawl carrying arm 148. This shaft is provided with a pin or lug 154 (Fig. XX) which lies directly below the pawl carrying arm 148, and said shaft may be turned one-fourth of a revolution from the position shown in Fig. XX so as to elevate the pawl carrying arm 148 to its inoperative position. This shaft 153 is also provided with an operating handle 155 (Figs. II and VI) which may be readily turned by the operator to place the multiplying attachment in an operative or in an inoperative condition.

When the retaining lever 141 is so positioned that it holds the arm 68 in its elevated position, the escapement dog 51 will cooperate with the ratchet bar 49 to hold the accumulator carriage in a fixed position. This, however, does not prevent the carriage from being moved to the right by the operator, for the spring 55 (Figs. XIII and XIV) will yield freely to permit the escapement dog 51 to turn on the axis of its pivot when the ratchet bar 49 is moved to the right.

The total wheels T may be termed "denominational members", for they indicate or represent units, tens, hundreds, etc., and the same is substantially true of the transmission wheels 72 associated directly with the total wheels. These "denominational members" are rotated selectively, through the medium of the master wheel 16 actuated by the numeral keys. Through the medium of the key controlled escapement device, movement of translation is imparted to the accumulator including the "denominational members" and these members may be rotated successively by depressing the numeral keys. When the multiplying attachment is in service, the escapement device is converted into a skip-step escapement, and the "denominational members" forming part of the traveling accumulator will then advance only one step in response to two successive key operations. By intermittently preventing movement of translation, i. e., by means of the skip-step escapement, I enable two digits of the same order to be successively set up or added on the same "denominational member", thereafter permitting the traveling accumulator to advance one step so that the movements of the master wheel 16 will be transmitted to the "denominational member" of next lower order.

I claim:—

1. In a calculating machine, an accumulator having total wheels, a traveling carriage movable step by step to provide for the transmission of movement to the different total wheels, keys, key controlled devices for operating said total wheels, said keys including an 0 key and keys representing the numerals 1 to 9 inclusive, key controlled devices for moving said carriage in response to movements of said keys, means for rendering the last mentioned key controlled devices inoperative to provide for the consecutive addition of several numbers of the same order, and means under the control of said 0 key for displacing the last mentioned key controlled devices from their inoperative condition so as to move the carriage from one order to another.

2. In a calculating machine, an accumulator having total wheels, a traveling carriage movable step by step to provide for the transmission of movement to the different total wheels, keys, key controlled devices for operating said total wheels, an escapement device adapted to move said carriage one step in response to each key movement, a latch device for locking said escapement device in an inoperative condition during several key operations to provide for the consecutive addition of said several numbers of the same order, and means for retaining said latch device in an inoperative position to allow said carriage to advance one step in response to each key operation.

3. In a calculating machine, an accumulator having total wheels, a traveling carriage movable step by step to provide for the transmission of movement to the different total wheels, keys and key controlled devices for actuating said total wheels, a key controlled escapement device adapted to advance said carriage one step in response to each key operation, said escapement device being provided with carriage holding dogs adapted to move in response to each key operation, and a multiplying attachment associated with said escapement device, said multiplying attachment including a retaining member for retaining one of said dogs in a position where the latter will prevent said carriage from advancing, a rotary releasing device for releasing said retaining member to permit the carriage to advance one step, a ratchet wheel for driving said rotary releasing device, a pawl for actuating said ratchet wheel, said pawl being movable in response to each key movement and said retaining member being movable to an inoperative position in response to two consecutive movements of said pawl so as to release said retaining dog in response to two consecutive key operations, thus providing for the consecutive addition of two numbers of the same order.

4. In a calculating machine, an accumulator having total wheels, a traveling carriage movable step by step to provide for the transmission of movement to the different total wheels, keys and key controlled devices for actuating said total wheels, the key controlled escapement device being adapted to advance said carriage one step in response to each key operation, and a multiplying attachment associated with said escapement device so as to render the latter ineffective during alternate key operations, said escapement device being provided with a dog for holding said carriage in a fixed position, and said multiplying attachment being provided with means for releasing said dog in response to two consecutive key operations so as to provide for the consecutive addition of two numbers of the same order, and means under the control of the operator for rendering said multiplying attachment ineffective so as to allow said carriage to advance one step in response to each key operation.

5. In a calculating machine, an accumulator, numeral keys, and means for transmitting movement from said numeral keys to said accumulator, said means including racks driven by said keys, gear wheels each of which is adapted to mesh with one of said racks when the latter moves in one direction, and means for releasing said racks from the gear wheels to permit said racks to move in the opposite direction without actuating said gear wheels, each of said racks being free to move in one of said directions while another rack is driven in the opposite direction.

6. In a calculating machine, an accumulator, numeral keys, and means for transmitting movement from said numeral keys to said accumulator, said means including key actuated racks movable with said keys, gear wheels operable by said racks, the teeth of said racks being normally out of engagement with said gear wheels, and means for disengaging the racks from the gear wheels upon the completion of the operative strokes of the racks to permit the latter to return without actuating said gear wheels, each of said racks being free to return during an operative stroke of another rack.

7. In a calculating machine, an accumulator, numeral keys, and means for transmitting movement from said numeral keys to said accumulator, said means including gear wheels, racks having teeth which are normally alined with but disengaged from the teeth of the said gear wheels, said racks being movable with the keys so as to transmit movement from said keys to said gear wheels, and means for disengaging said racks from the gear wheels upon the completion of the operative strokes of the racks to prevent the latter from actuating the gear wheels during the return movement of the racks, each of said racks being free to move from its normal position while another rack is idly returning to the normal position.

8. In a calculating machine, an accumulator, numeral keys, and means for transmitting movement from said numeral keys to said accumulator, said means including racks operable by said keys, gear wheels each of which is adapted to mesh with one of said racks when the latter moves in one direction, a shaft to which all of said gear wheels are fixed, each of said racks being movable with said keys and all of said gear wheels being adapted to turn in response to movements of any one of the racks, and means for disengaging each rack from the teeth of the adjacent gear wheel upon the completion of the operative stroke of the rack to permit the latter to return to its normal position without actuating said shaft and gear wheels.

9. In a calculating machine, an accumulator, numeral keys, and means for transmitting movement from said numeral keys to said accumulator, said means including rack carriers movable with said keys, each of said carriers being provided with a rack, a series of gear wheels each of which is adapted to mesh with one of said racks, rack shifters each of which is adapted to shift one of the racks to an inoperative position upon the completion of the operative stroke of the rack and also adapted to retain the rack in an inoperative position during the return stroke of the rack.

10. In a calculating machine, an accumulator, numeral keys, and means for transmitting movement from said numeral keys to said accumulator, said means including rack carriers each of which is driven by one of said keys, a series of racks each of which is pivoted to one of said rack carriers, a series of gear wheels each of which is adapted to mesh with one of said racks, and a series of yieldable rack shifters each of which is associated with one of said racks, each yieldable rack shifter being arranged to engage a part of one of the rack bars so as to retain said rack bar in engagement with the teeth of the adjacent gear wheel during the operative strokes of said rack and also adapted to engage a part of said rack to retain the rack out of engagement with the adjacent gear wheel during the inoperative strokes of the rack.

11. In a calculating machine, an accumulator, numeral keys, and means for transmitting movement from said numeral keys to said accumulator, said means including a series of rack carriers each of which is movable in response to movements of one of the keys, a series of racks each of which is pivoted to one of said rack carriers, and a series of yieldable rack shifters each of which is associated with one of said racks, each of said rack shifters being provided with a projecting member and each rack being provided with a projection adapted to engage the projecting member on one of said rack shifters, the projection on each rack being adapted to travel along one face of the projecting member on the adjacent shifter during the operative strokes of the rack and adapted to travel along the opposite face of said projecting member during the inoperative strokes of the rack, and each of said projecting members being provided with a cam face for deflecting one of the racks from an operative to an inoperative position.

12. In a calculating machine, an accumulator, numeral keys, and means for transmitting movement from said numeral keys to said accumulator, said means including rack carriers secured to said keys, racks pivoted to said rack carriers, gear wheels adapted to mesh with said racks, a series of springs each of which tends to retain the teeth of one of the racks in alinement with the teeth of one of said gear wheels, a series of rack shifters each of which is associated with one of said racks, a pivotal support for said rack shifters, springs connecting said rack shifters to said rack carriers each of said rack shifters being arranged to retain one of the racks in engagement with one of the gear wheels during the operative strokes of said racks, and each of said shifters being adapted to yield upon the completion of the normal strokes the rack with which it is associated so as to deflect the rack from its operative to its inoperative position.

13. In a calculating machine, an accumulator, numeral keys, and means for transmitting movement from said numeral keys to said accumulator, said means including a series of racks each of which is operable by one of said keys, a series of gear wheels each of which is driven by one of said racks, a shaft to which all of said gear wheels are fixed, the teeth of the racks being normally out of engagement with the teeth of said gear wheels, and means for shifting each rack from the adjacent gear wheel upon the completion of the operative strokes of the rack so as to permit the rack and its key to return in an inoperative position, thus allowing another rack to be actuated while one of the racks is returning to its operative position.

14. In a calculating machine, an accumulator, numeral keys, and means whereby movement is transmitted to said accumulator in response to movements of said numeral keys, said means including gear wheels, toothed driving members for actuating said gear wheels, said toothed driving members being normally disengaged from said gear wheels, each of said toothed driving members being associated with and driven by one of said keys, and any selected two of said driving members being free to move in opposite directions at the same time so that one of the toothed driving members can be actuated while another is returning to its normal position.

15. In a calculating machine, an accumulator, numeral keys, and means whereby movement is transmitted to said accumulator in response to movements of said numeral keys, said means including gear wheels, toothed driving members for actuating said gear wheels, said toothed driving members being normally disengaged from said gear wheels, each of said toothed driving members being associated with and driven by one of said keys, each of said toothed driving members being movable from its normal position so as to actuate its companion gear wheel, and means for shifting said toothed driving members out of operative engagement with the adjacent gear wheels upon the completion of the operative strokes of said toothed driving members, thereby allowing said toothed driving members to return idly to their normal positions, and any selected two of said toothed driving members being free to move in opposite directions at the same time, so that one of the toothed driving members can be selected and actuated while another of said driving members is returning idly to its normal position.

16. In a calculating machine, an accumulator having total wheels of different order, a master wheel adapted to actuate said total wheels, numeral keys, and means whereby movement is transmitted to said master wheel in response to movements of said numeral keys, said means including gear wheels each of which is associated with one of said numeral keys, toothed driving members for actuating said gear wheels, said toothed driving members being normally disengaged from said gear wheels, each of said toothed driving members being associated with and under the control of one of said keys, each of said toothed driving members being movable from its normal position so as to actuate its companion gear wheel, and means for shifting said toothed driving members out of operative engagement with the adjacent gear wheels upon the completion of the operative strokes of said toothed driving members, thereby allowing said toothed driving members to return idly to their normal positions, and any selected two of said toothed driving members being free to move in opposite directions at the same time, so that one of the toothed driving members can be selected and actuated to drive the master wheel while another of said driving members is returning idly to its normal position.

17. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said selective carriage moving device including an arm provided with a series of keys, means for transmitting movement from said arm to said carriage, a stop device movably fitted to said arm, an abutment, said stop device being provided with a series of steps each of which is adapted to engage said abutment to limit the movement of said arm and carriage, the different keys being adapted to move the stop device different distances and each key being adapted to locate one of the steps in a position where it will strike said abutment.

18. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including an arm provided with a series of keys, means for transmitting movement from said arm to said carriage, a stop device provided with a series of stops in the form of steps, an abutment adapted to be engaged by any one of said stops to limit the movement of said arm and carriage, said stop device being movable different distances to locate any one of the steps in a position where it will engage said abutment and said stop device being movable in response to movements of said keys, and a series of stops for limiting the movements of said keys with respect to said arm, the last mentioned stops being carried by said arm.

19. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including an arm, a pivotal support for said arm, means for transmitting movement from said arm to said carriage, a stepped stop device pivoted to said arm, an abutment adapted to engage the different steps of said stop device to limit the movement of said carriage, a series of keys pivoted to said arm and adapted to actuate said stepped stop device to move the latter with respect to said arm, and stops for limiting the movements of said keys.

20. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a series of keys, means for transmitting movement from said keys to said carriage, stops under the control of said keys, and an abutment device adapted to be engaged by said stops to limit the movements of said keys and carriage, said abutment device including a plurality of abutments arranged in different planes, each of said abutments being adapted to coöperate with said stops, and said abutment device being adjustable to locate either of said abutments in the path of said stops.

21. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a series of keys, means for transmitting movement from said keys to said carriage, stops under the control of said keys, and an abutment device adapted to be engaged by said stops to limit the movements of said keys and carriage, said abutment device including a plurality of abutments arranged in different planes, each of said abutments being adapted to coöperate with said stops, and said abutment device being adjustable to locate either of said abutments in the path of said stops, and means for locking said abutment device in different positions to secure the selected abutment in the path of said stops.

22. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a series of keys, means for transmitting movement from said keys to said carriage, stops under the control of said keys, and an abutment device adapted to be engaged by said stops to limit the movements of said keys and carriage, said abutment device including a plurality of abutments arranged in different planes, each of said abutments being adapted to coöperate with said stops, and said abutment device being adjustable to locate either of said abutments in the path of said stops, and a gage associated with said abutment device to insure the location of the selected abutment in a position where it will coöperate with said stop device.

23. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a series of keys, means for transmitting movement from said keys to said carriage, stops under the control of said keys, and an abutment device adapted to be engaged by said stops to limit the movements of said keys and carriage, said abutment device including a plurality of abutments arranged in different planes, each of said abutments being adapted to coöperate with said stops, and said abutment device being adjustable to locate either of said abutments in the path of said stops, a gage, and a pivotal support for said gage, said gage being provided with faces which lie at different distances from the axis of said pivotal support, and said abutment device being adapted to engage one of said faces when a selected abutment is located in the path of said stop device.

24. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a series of keys, stops for limiting the movements of said keys, and means for transmitting movement from said keys to said carriage, one of said keys being a main key operable to restore the carriage to its normal and starting position, and the other keys being pivoted to said main key and adapted to move the carriage different distances toward said normal or starting position.

25. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a shaft, means for transmitting movement from said shaft to said carriage, an operating arm mounted on said shaft, and means for limiting the movements of said operating arm to predetermine the movements of said carriage, said operating arm being foldable to an inoperative position.

26. In a calculating machine having an accumulator provided with accumulator wheels of different order and a traveling carriage movable step by step to provide for the transmission of movement to accumulator wheels of different order; a selective carriage moving device for shifting said carriage to different predetermined points to provide for the transmission of movement to an accumulator wheel of a predetermined order, said carriage moving device including a shaft, means for transmitting movement from said shaft to said carriage, an operating arm mounted on said shaft, and means for limiting the movements of said operating arm to predetermine the movements of said carriage, said operating arm being foldable to an inoperative position, and a clutch device for securing said operating arm to said shaft.

27. In a calculating machine, an accumulator having total wheels, a traveling carriage movable step by step to provide for the transmission of movement to the different total wheels, keys and key controlled devices for actuating said total wheels, and a key controlled escapement device for advancing said carriage, said escapement device being provided with a retaining dog for holding said carriage in a fixed position during an indefinite number of key operations to provide for the consecutive addition of many different numbers of the same order, and releasing means, under the control of the operator, whereby said retaining dog is released and rendered ineffective.

FERDINAND J. TILLMAN.